United States Patent [19]

Moreno

[11] 4,131,364
[45] Dec. 26, 1978

[54] PAPER GUIDE DEVICE FOR COPYING MACHINES

[76] Inventor: Jose A. Moreno, 612 Westboro Ave., Alhambra, Calif. 91803

[21] Appl. No.: 848,278

[22] Filed: Nov. 3, 1977

[51] Int. Cl.² ............................................. G03B 27/30
[52] U.S. Cl. ...................................... 355/106; 271/64; 355/110
[58] Field of Search ................. 355/79, 100, 104, 106, 355/107, 110, 117; 271/64, 172

[56] References Cited

U.S. PATENT DOCUMENTS

| | | | |
|---|---|---|---|
| 3,416,863 | 12/1968 | Ralston | 355/110 |
| 3,617,053 | 11/1971 | Menard | 271/64 |

Primary Examiner—Richard A. Wintercorn
Attorney, Agent, or Firm—Erik M. Arnhem

[57] ABSTRACT

A paper guiding device for the discharge of copied original sheets from and mountable on copying machines. Said guiding device comprises first elongated flexible guide means provided with fastening means for mounting adjacent the opening from which the original is discharged, the free end or ends of which extend curvedly and vertically upward and backwardly over portions of the front and top surfaces of the copier; a second elongated shorter guide means mounted along the upper front edge of the copier and extending bidirectionally curvedly thereover, beneath and substantially parallel with a length portion of the first guide means; the original, in being discharged, is caused to move upwardly on and along the first guide means, and then into the passage formed by the overlapping portions of said two guide means and beyond, to the top surface of the copier.

11 Claims, 3 Drawing Figures

PAPER GUIDE DEVICE FOR COPYING MACHINES

BACKGROUND OF THE INVENTION

The invention relates to guide means, easily attachable to a copying machine, for purpose of facilitating the removal of an original therefrom, subsequent to its having been subjected to an exposure process with a copying paper therewithin. The guide means, according to the invention, are particularly suitable for those copiers, which require separate and successive exposure and development process for the copying paper. Optimum economical use of copying machines is partly contingent on the speed with which they can produce finished copies. When the copying speed reaches a rate, with which the operator cannot adequately cope, "excessive" production of copies occurs, e.g., when the operator is charged with too many chores, such as feeding original and copying paper into the machine, separate them on their discharge, then refeed the copying paper for development, and finally dispose of the originals; the operator is then either forced to curtail feeding of new material to the copier, until the above mentioned operational steps have been completed; or his neglect of the latter will cause the discharged originals to drop to the floor in a disorderly manner or to be inadvertently fed back into the machine, thus blocking or impeding the internal operation of same. It appears, that adequate means to eliminate the above stated drawbacks in a satisfactory manner have not yet been developed for high-speed copying machines.

SUMMARY OF THE INVENTION

It is therefore an object of the invention to provide guiding means, easily mountable on copiers, which will motivate the channeling and conveying of discharged copied originals away from its outlet opening with little or no manual assistance of the operator.

Another object of the invention is to provide paper guiding means which are adaptable for attachment to different types of copying machines.

It is a further object of the invention to provide such paper guiding means which are inexpensive to manufacture and safe in operation.

In addition to the information stated under (c), (e) and (f), my invention is particularly adaptable for use on copying machines and printers, which require that the copying paper undergoes distinct exposure and developing processes within the copier, before the copy is ready. Such copying machines are generally provided with three openings disposed in the front panel thereof, i.e., a first inlet, through which an original, e.g., a translucent drawing, is introduced face-to-face with a copying sheet, e.g., a diazo paper; a second outlet discharging the two papers after the exposure process; and a third opening into which the exposed copying paper alone is fed for the developing process. These machines are generally serviced by one operator, whose duty it is to feed originals and copying papers in rapid succession into the machine, in addition to handling and orderly disposing of the subsequently discharged originals and copies.

The invention, more particularly relates to a first guide means, preferably in the form of two elongated flexible strips, each of which terminating in a broadening mount base, by which they are attached linearly spaced under or near the second (outlet) opening of the copier, as described above; said guide strips extend loosely from their mounting locations curvedly upward and rearwardly over a portion of the upper front and top surfaces of the copier.

The second guide means, of shorter length than the first guide menas, e.g., preferably in the form of two resilient elongated strips, respectively provided with a mount base, dividing each such strip into two sections, which, when mounted linearly spaced on the upper front edge of the copier will slope bi-directionally curvedly and loosely over portions of the upper front and top surfaces, respectively of the copier.

The second set of guide strips are furthermore disposed on the copier in such a manner, that it will lie underneath substantially parallel with and along length portions of the first set of guide strips.

The original and the copying paper, in being discharged, subsequent to the exposure process, through the second outlet opening of the copier, are separated at their leading edges by the operator; the original will, be virtue of the impetus provided by discharging rollers within the copier slide along the interior sides of the first guide strips, move upwardly, then pass through the passage created by overlapping portions of the two sets of guide strips, and finally come to a standstill near the top of the copier. While the original thusly moves along the guide strips, the operator guides the separated leading edge of the copying paper into the third (inlet) opening of the copier for the development process therewithin.

Brief Description of the Invention

DESCRIPTION OF PREFERRED EMBODIMENT

Figure 1:
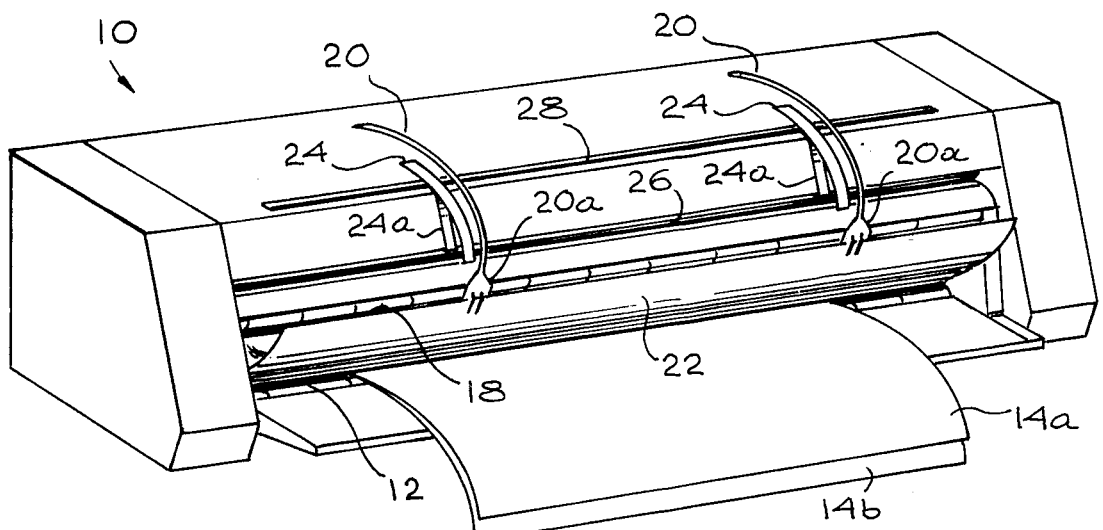
FIG. 1 is a perspective front view of a typical blueprint copier with attached paper guides, according to the invention.

The following description of the basic operational features of a conventional copier does, of course not constitute part of my invention, but is included as background information on the invented paper guiding means.

In the drawings like reference characters designate similar parts in the several views.

Referring now in detail to the drawings, numeral 10, as illustrated in FIG. 1, designates a copying machine, having a first (inlet) opening 12, into which an original document 14a, e.g., a drawing, face-to-face with a copying sheet 14b, are fed, proceeding therewithin (FIG. 2) under a revolving exposure cylinder 16 and returning through a second (outlet) opening 18.

A first paper guiding means, e.g., in the form of a set of two elongated flexible strips 20, terminating in broadening base mounts 20a, (FIG. 3), by which they are mounted linearly spaced above first opening 12; some copiers are provided with a paper receiving tray 22 (as illustrated on FIG. 2), in which case the guide strips 20 may be mounted on the outer edge of tray 22.

Figure 2:
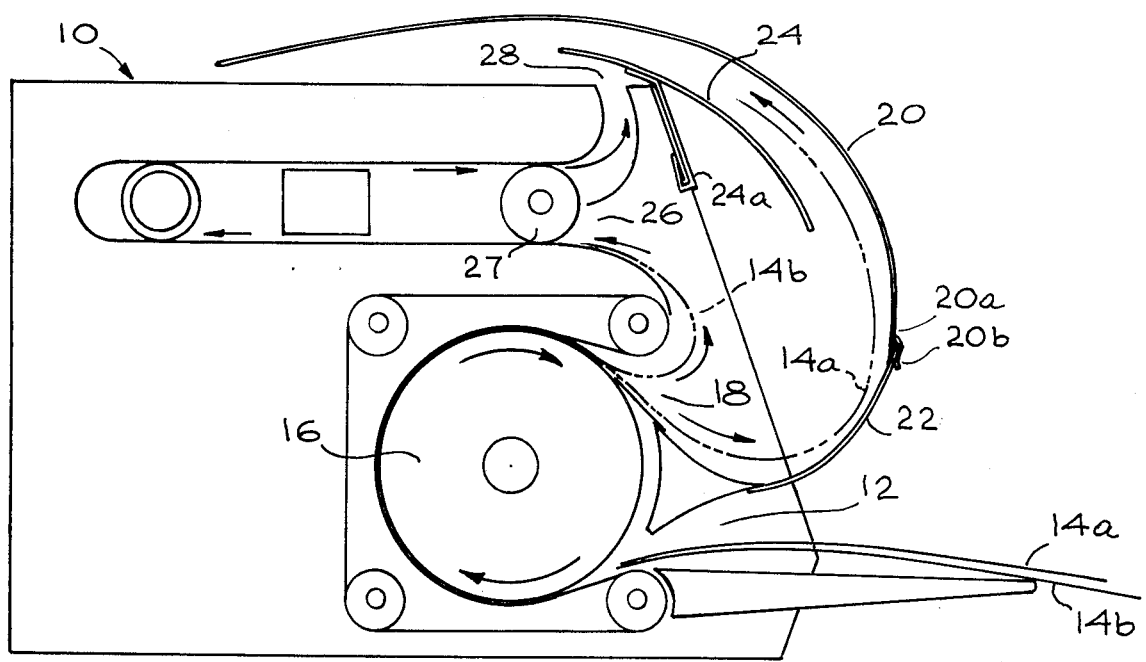
FIG. 2 is a schematic sectional side view of the copier.
Figure 3:
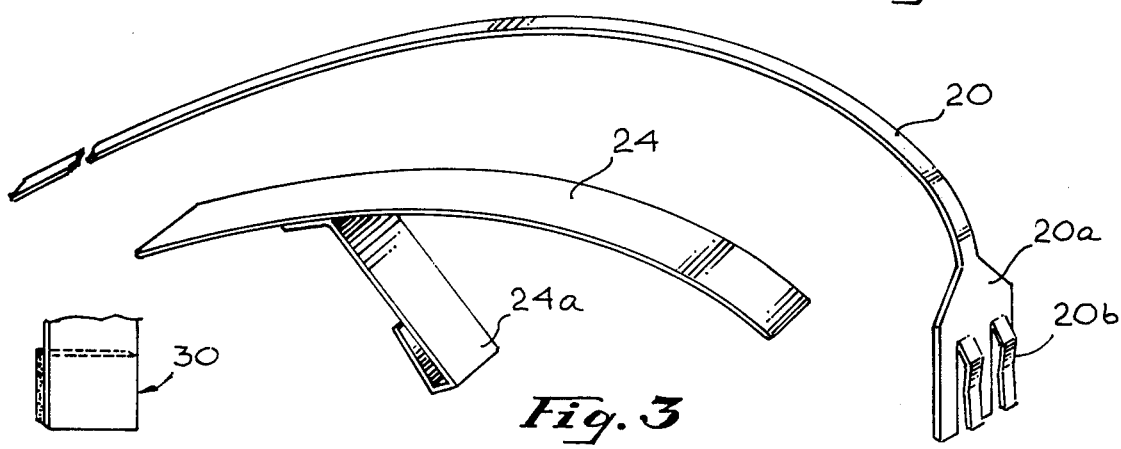
FIG. 3 illustrates perspective front view of the two different types of paper guide means utilizied, according to the invention.

The free ends of guide strips 20 extend from their mounted position (at 20a) curvedly upward and backward over front and top portions of copier 10 (FIG. 2). The mounting ends of guide strips 20, i.e., mount base 20a (FIG. 3) are provided with stamped out fingers 20b, which easily snap onto the edges of tray 22 or the surface above opening 12.

A second paper guiding means, e.g., in the form of a set of two flexible and resilient guide strips 24, being of shorter length than guide strips 20, are mounted linearly spaced along the upper front edge area of copier 10, so as to directly underlie the first set of guide strips 20, e.g., by means of strip length 24a, in the form of a hook like fold (FIG. 3), extending substantially vertical, preferably from an off-centered location on and integrally with each guide strip 24, which easily snaps on to the copier.

The second set of guide strips 24, when thusly mounted, then extends curvedly underneath and substantially parallel with an overlapping length portion of the first set of strip guides 20, sloping loosely down bi-directionally over parts of the upper front and top surface, respectively of copier 10, and forms a passage with guide strips 20 (FIG. 2).

As soon as the original and copying paper 14a, b begin to appear through opening 18 (as mentioned above), the operator separates their leading edges and then guides the copying paper 14b into a third (inlet) opening 26, until it engages a roller 27 that pulls the copying paper 14b further inwardly, away from original 14a, into the copier for the development process.

The original 14a is, at the same time and without the assistance of the operator, continuing to discharge through opening 18 by virtue of the rotary force of cylinder 16, and will slide upwardly along the curved contours of guide strip 20, due to its own gravity and curvature (imparted to it by cylinder 16), into the passage created by said two sets of guide strips.

The dimensions of the conventional type original sheet are 24 × 36; and will, when completely out of the machine, occupy almost the entire length of guide strips 20, until removed therefrom by the operator.

The copy 14b, after having undergone the development process, i.e., in a heated ammonia chamber, will reappear, as a finished copy, through a fourth (outlet) opening 28, which normally is located on top of or on the back of the copier (FIG. 2).

Guide strips 24, in particular, are made of flexible and resilient material, so as not to offer any resistance to or exert pressure on the movements of the discharged originals and copies.

As noted above, the operator's initial duties include feeding of original and copy into the copier, separation of their leading edges, enabling the original by virtue of the invented paper guide means, to move without assistance from the operator, along the paper guide strips while the copy is guided into the development chamber.

While original and copy thus move on, outside, respectively inside the copier, the operator has sufficient time to take a new set of original and copy and feed them into the machine.

During the time the latter are in the exposure chamber, the operator removes the preceding original and copy, which now, respectively is lying between the two sets of guide strips and on top of the copier adjacent opening 27; then; again the operator turns to the new original and copy appearing through opening 18, separates their leading edges and so on.

By virtue of the paper guiding means, according to the invention, the originals are guided away from the working areas of the copier with little or no assistance from the operator and are prevented from dropping to the floor or moving back into a feed opening of the copier, due to inattendence of the operator.

The dimensions (length, width, thickness) of the paper guides (20, 24) may depend on the material of which they are made, e.g., plastic, cardboard, aluminum, metal wire, etc., and their being adapted to various copier models which may be provided with feed and discharge openings at different locations. The preferred average width and length of paper guide 20 are 18 × ¼ inch. The preferred average width and length of paper guide 24 are 9 × 1 inch.

The mount bases 20a, 24a of guide strips 20, 24 respectively, may be fastened to the copier in the above described manner, but may also be attached thereto by magnetic attraction or adhesion, 30 or in any other appropriate manner; in which case the fingers 20b of strip 20, and the folded portion of center length 24a of strip 24 may be eliminated. The eventual choice of fastening meas for paper guides 20, 24 will then depend on the particular construction of the copier.

While the foregoing has illustrated and described what is now contemplated to be the best mode of carrying out the invention, are, of course, subject to modifications without departing from the spirit and scope of the invention. Therefore, it is not desired to restrict the invention to the particular constructions illustrated and described, but to cover all modifications, that may fall within the scope of the appended claims.

I claim:

1. In a paper guiding device for copied original sheets being discharged from an opening in a copying machine, comprising:
    (a) a first upwardly extending paper guiding means, mounted below the said opening along which the discharged original is caused to move upwardly;
    (b) a second paper guiding means, mounted at a location on the copying machine above and extending beneath said first paper guiding means, so as to create a passage therewith, through which a portion of said origianl will pass before coming to a standstill on the copying machine.

2. Paper guiding device, according to claim 1, wherein said first guiding means consists of one elongated flexible strip having a broadening mount base.

3. Paper guiding device, according to claim 1, wherein said first guiding means consists of at least two elongated flexible strips, respectively provided with a broadening mount base for spaced linearly mounting below the discharge opening of the copying machine.

4. Paper guiding device, according to claim 3, wherein the mount base of said first guiding means is provided with at least one finger for snap-on mounting onto the 4 copying machine.

5. Paper guiding device, according to claim 1, wherein said second guiding means consist of one elongated flexible strip provided with a mount strip extending therefrom, and dividing said strip into two sections.

6. Paper guiding device, according to claim 1, wherein said second guiding means consists of at least two elongated flexible strips, respectively provided with a mount strip extending substantially vertical therefrom and dividing each second guiding strip into two sections, for spaced linear mounting adjacent the upper front edge of the copying machine, causing said second guiding strip to slope bi-directionally loosely over top and front portions of the copying machine.

7. Paper guiding means, according to claim 6, wherein the mount strip is provided with a hook-like fold for snap-onto mounting on the copying machine.

8. Paper guiding device, according to claim 2, wherein the mount base is provided with an adhesive agent.

9. Paper guiding device, according to claim 2, wherein the mount base is provided with a magnetic surface.

10. Paper guiding device, according to claim 5, wherein mount strip is provided with an adhesive agent.

11. Paper guiding device, according to claim 5, wherein the mount strip is provided with magnetic surface.

* * * * *